US012719576B2

(12) United States Patent
Gantz et al.

(10) Patent No.: US 12,719,576 B2
(45) Date of Patent: Aug. 25, 2026

(54) THERMAL-EFFICIENT RING-BASED COARSE WAVELENGTH DIVISION MULTIPLEXING OPTICAL LINK

(71) Applicant: NVIDIA Corporation, Santa Clara, CA (US)

(72) Inventors: Liron Gantz, Haifa (IL); Shai Cohen, Haifa (IL); Dor Oz, Tel Aviv (IL); Alon Gabbay, Yokneam (IL); Idan Yokev, Ra'anana (IL)

(73) Assignee: NVIDIA Corporation, Santa Clara, CA (US)

( * ) Notice: Subject to any disclaimer, the term of this patent is extended or adjusted under 35 U.S.C. 154(b) by 351 days.

(21) Appl. No.: 18/502,594

(22) Filed: Nov. 6, 2023

(65) Prior Publication Data

US 2025/0150170 A1 May 8, 2025

(51) Int. Cl.
*H04B 10/2581* (2013.01)
*G02B 6/42* (2006.01)
*H04J 14/02* (2006.01)

(52) U.S. Cl.
CPC ....... *H04B 10/2581* (2013.01); *G02B 6/4215* (2013.01); *H04J 14/02* (2013.01)

(58) Field of Classification Search
None
See application file for complete search history.

(56) References Cited

U.S. PATENT DOCUMENTS 10,451,806 B1 10/2019 Puckett et al.
10,727,952 B1 7/2020 Vollmerhausen
10,862,588 B1 12/2020 Xie
2002/0024693 A1* 2/2002 Manor .................... H04J 14/02 398/91
2007/0036553 A1 2/2007 Etemad et al.
2007/0258714 A1* 11/2007 Little ................... G02B 6/2938 398/76
2008/0193133 A1* 8/2008 Krug ................... H04J 14/0219 398/83
2009/0238515 A1* 9/2009 Fattal ................. G02B 6/12007 385/30
2011/0310917 A1 12/2011 Krishnamoorthy et al.
2012/0237155 A1 9/2012 Zheng et al.
2013/0037692 A1* 2/2013 Akiyama .............. G02F 1/0147 250/201.1
2014/0064734 A1* 3/2014 Witzens ............. H04B 10/6164 398/79
2015/0104176 A1* 4/2015 Baehr-Jones ........ H04B 10/503 398/79

(Continued)

FOREIGN PATENT DOCUMENTS

EP 3952151 A1 2/2022
WO 2022256904 A1 12/2022

*Primary Examiner* — Darren E Wolf
(74) *Attorney, Agent, or Firm* — Lowenstein Sandler LLP

(57) ABSTRACT

A system can include a unit cell of a ring modulator of a coarse wavelength division multiplexing (CWDM) optical link. The unit cell includes a ring resonator including a ring waveguide configured to receive, via a first bus waveguide, an optical signal, and modulate the optical signal to generate a modulated optical signal. The unit cell further includes a multiplexer, disposed between the first bus waveguide and a second bus waveguide, configured to filter the modulated optical signal.

19 Claims, 7 Drawing Sheets

(56) References Cited

U.S. PATENT DOCUMENTS

| | | | | |
|---|---|---|---|---|
| 2015/0303653 | A1* | 10/2015 | Tanaka | G02B 6/1228<br>372/7 |
| 2015/0316794 | A1* | 11/2015 | Hayakawa | G02F 1/0121<br>385/2 |
| 2016/0301477 | A1 | 10/2016 | Orcutt | |
| 2017/0187483 | A1 | 6/2017 | Mansouri Rad et al. | |
| 2018/0159293 | A1* | 6/2018 | Bovington | H01S 5/5045 |
| 2020/0310035 | A1* | 10/2020 | Bhargava | G02B 6/12007 |
| 2020/0413167 | A1 | 12/2020 | Testa et al. | |
| 2022/0190922 | A1 | 6/2022 | Vegas Olmos et al. | |
| 2022/0390280 | A1* | 12/2022 | Pavanello | G01J 3/0259 |
| 2024/0007192 | A1 | 1/2024 | Davenport et al. | |

* cited by examiner

100
Device 110
Transceiver 116
Digital data source 120
Transmitter 102
Processing Circuitry 132
Receiver 104
Communication network 108
Channel 109
Device 112
Transceiver 136
Receiver 104

400

THERMAL-EFFICIENT RING-BASED COARSE WAVELENGTH DIVISION MULTIPLEXING OPTICAL LINK

TECHNICAL FIELD

At least one embodiment pertains to processing resources used to perform and facilitate high-speed communications. For example, at least one embodiment pertains to technology for implementing thermal-efficient ring-based coarse wavelength division multiplexing (CWDM) optical links.

BACKGROUND

Communication systems transmit signals from a transmitter to a receiver via a communication channel or medium (e.g., cables, printed circuit boards, links, wirelessly, etc.) For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which.

DETAILED DESCRIPTION

Figure 1:
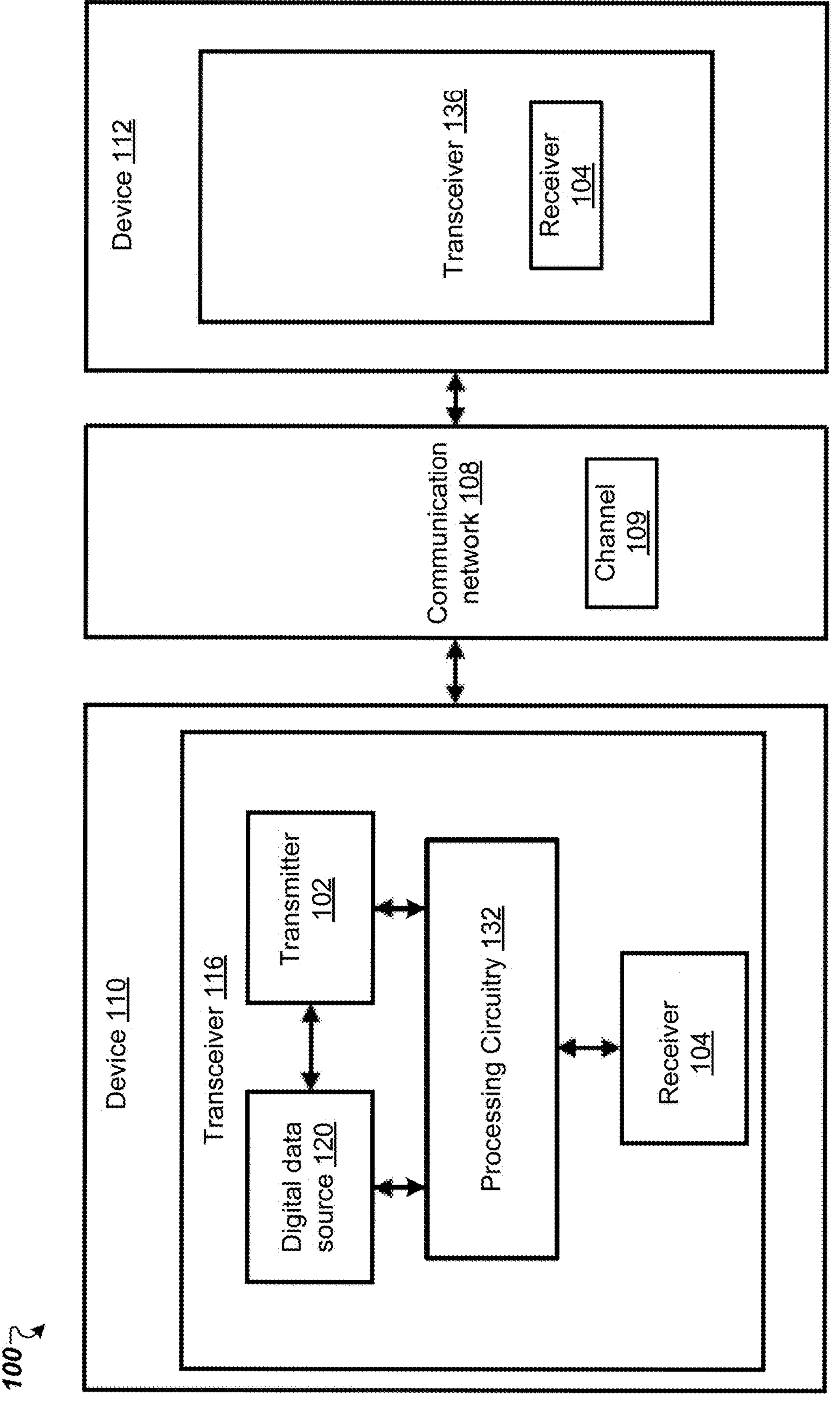
FIG. 1 is a block diagram of an example communication system, in accordance with at least some embodiments.

Embodiments described herein relate to implementing thermal-efficient ring-based coarse wavelength division multiplexing (CWDM) optical links. Optical links are communication links that use optical fibers to transmit optical signals (e.g., data signals or data streams) between two points. For example, an optical transmitter ("transmitter") can receive optical signals generated by one or more optical signal generators, and the transmitter can transmit optical signals to an optical receiver ("receiver"). In some implementations, an optical signal generator includes a laser. A transmitter can include a modulator that can encode data onto an optical signal using modulation, and the transmitter can transmit modulated optical signals to a receiver. The receiver can include a photodetector to detect optical signals (e.g., modulated optical signals) received from the transmitter, and can convert the optical signals into electrical signals that can be processed by an electronic device. Optical links can be used to transmit large amounts of data over long distances with minimal signal loss. Optical links can be used in a variety of applications that can utilizes the transmission of optical signals, such as switches, processing units (e.g., graphics processing units (GPUs), etc.

The optical signals received by the receiver can include polarized light each corresponding to a respective polarization, or electromagnetic mode. A receiver can receive polarized light via one or more waveguides. For example, a receiver can receive polarized light having a first electromagnetic mode via a first waveguide and a second electromagnetic mode different from the first electromagnetic mode via a second waveguide.

Each of the electromagnetic modes can reflect polarized light having a respective polarization state. One example of a polarization state is a linear polarization state (e.g., confinement of the electric field of light to a single plane along the direction of propagation). If the optical receiver receives polarized light having a first electromagnetic mode ($EM_1$) and polarized light having a second electromagnetic mode ($EM_2$), then the optical receiver can receive a mixture of polarized light as $\alpha EM_1 \times \beta EM_2$, where $\alpha, \beta \in [0,1]$ and $\alpha+\beta=1$. Accordingly, the optical receiver can receive either entirely polarized light having the first electromagnetic mode, entirely polarized light having the second electromagnetic mode, or any suitable mixture of polarized light having the first and second electromagnetic modes. In some implementations, the first electromagnetic mode can be a transverse-magnetic (TM) mode and the second electromagnetic mode can be a transverse-electric (TE) mode. For example, the TE mode can reflect polarized light having s-polarization (e.g., the electric field is parallel to the plane of incidence of light), and the TM mode can reflect polarized light having p-polarization (e.g., the electric field is perpendicular to the plane of incidence of light).

A relationship exists between the local or effective index of refraction of a waveguide medium (e.g., silicon) and the velocity or speed at which a pulse of light travels through the waveguide, referred to as group velocity. More specifically, group velocity refers to the speed at which a range of frequencies travel to create a time-domain pulse. For example, group velocity can be approximated as $$\frac{c}{n_i},$$

where c refers to the speed or light in a vacuum and $n_i$ refers to an effective index of refraction of the waveguide for guiding an optical signal having to an i-th electromagnetic mode (e.g., TM mode or TE mode).

Illustratively, light received by the optical receiver can be received by (e.g., impinged onto) a photodetector from two separate polarized light inputs. For example, polarized light having the TM mode and polarized light having the TE mode at the same frequency can be combined and injected into a photodetector. Alternatively, polarized light having the TM mode and polarized light having the TE mode may be injected into the photodetector without being combined. As mentioned above, polarized light having different electromagnetic modes can travel through respective waveguides having different indices of refraction. Therefore, polarized light having different electromagnetic modes can arrive at the photodetector at different times, where the difference in time is a function of at least the length of the waveguide and the difference in group velocity between the different electromagnetic modes. Local temperature variations, which result in variations in the indices of refraction and thus group velocity as described above, can also impact the arrival times of polarized light to their respective destinations. These impacted arrival times can result in errors in the received optical signals. For example, these effects can be observed with respect to an optical component (e.g., optical chip) into a device (e.g., switch, GPU and/or CPU), as the optical component can experience local temperature variations as the device heats up or cools down in accordance with its workload. Moreover, polarized light having one electromagnetic mode may see a different temperature and perhaps a path length difference due to fabrication variation as compared to polarized light having another electromagnetic mode, which should generally be compensated for to reduce or eliminate jitter and errors.

Various optical networking technologies can be used for transmitting multiple optical signals (e.g., data signals or data streams) over a single optical fiber within an optical link with little to no optical signal interference. Such optical networking technologies can increase the amount of data that can be transmitted via a single optical fiber, which can increase bandwidth efficiency and reduce the amount of infrastructure (e.g., hardware) needed for data communication.

One type of optical networking technology is time division multiplexing (TDM). In TDM, multiple optical signals (e.g., data signals or data streams) can be transmitted over a single optical fiber by assigning each optical signal a respective time slot, and transmitting an optical signal during its respective time slot. The time slots can be allocated to optical signals in a cyclic manner, in which each optical signal transmits a small amount of data during its assigned time slot. The time slots can be very short, such as on the order of microseconds, and the cycle is repeated many times per second to allow for rapid data transfer.

Another type of optical networking technology is frequency division multiplexing (FDM). In FDM, multiple optical signals (e.g., data signals or data streams) can be transmitted over a single optical fiber by assigning each optical signal a respective frequency band. More specifically, each optical signal can be modulated onto a respective carrier frequency to generate a respective modulated signal, and the modulated signals can be combined and transmitted by a receiver over a single optical fiber. At the receiver, the modulated signals can be separated using one or more filters (e.g., band-pass filters). More specifically, the one or more filters permit optical signals to pass through that meet one or more frequency specifications set by the one or more filters, while filtering out signals that do not meet the one or more frequency specifications. Accordingly, FDM can be used by optical links to simultaneously transmit multiple channels simultaneously over the same frequency band.

Yet another type of optical networking technology is wavelength division multiplexing (WDM). In WDM, multiple optical signals (e.g., data signals or data streams) having different wavelengths can be combined into a single optical signal and transmitted over a single optical fiber (e.g., simultaneous transmission of multiple wavelengths of light). More specifically, WDM techniques can generally involve combining and separating multiple optical signals having different wavelengths onto a single optical fiber. By doing so, WDM technology can allow for more data to be transmitted over an optical fiber and/or increase the capacity of the optical fiber.

Examples of WDM technology includes coarse wavelength division multiplexing (CWDM) and dense wavelength division multiplexing (DWDM). In CWDM, multiple optical signals (e.g., data signals or data streams) at different wavelengths are combined into a single optical signal and transmitted over a single optical fiber. The names CWDM and DWDM refer to the coarseness and denseness, respectively, of wavelength separation between wavelengths. More specifically, CWDM uses a coarser or wider wavelength separation than DWDM, which uses a denser or narrower wavelength separation. For example, wavelengths for CWDM can be separated by, e.g., about 80 nanometers (nm), while wavelengths for DWDM can be separated by, e.g., about 0.8 nm. The wider wavelength separation used in CWDM means that CWDM can support fewer channels and have lower power budgets than DWDM, and so CWDM can be used for shorter distances than DWDM, such as, e.g., up to about 80 kilometers (km). At the same time, CWDM uses less complex equipment and can use lower-cost optical components as compared to DWDM, which can make it a more cost-effective solution for applications that may not require denser wavelength separation.

Optical link technology is moving toward the use of co-packaged architectures in which multiple components are combined into a single package, rather than separately packaging each component. Examples of components includes processors, memory, input/output (I/O) interfaces, etc. The use of co-packaged architectures can provide benefits as compared to separately packaged architectures, such as reduced power consumption, lower latency, higher bandwidth, and improved system efficiency. For example, by integrating multiple components into a single package, the distance that a signal needs to travel between components is reduced, which can reduce signal delays, improve performance, and reduce power consumption as less power may be needed to transmit signals over shorter distances. Thus, co-packaged architectures can be used in high-performance computing (HPC) and/or data intensive applications.

For example, a co-packaged architecture can be used to implement CWDM. Some co-packaged architectures that implement CWDM include Mach Zehnder modulators (MZMs). An MZM is an interferometer that leverages the electro-optic effect, in which a change in the refractive index of a material is induced by an applied electric field, to create an interference pattern that can be modulated to encode information onto an optical signal. An MZM can include a waveguide that includes an input portion to receive an optical signal, a central portion include a pair of arms that split from the input portion, and an output portion that outputs a recombined optical signal generated by recombining the output of each pair of arms. More specifically, the pair of arms can be formed from a material that exhibits the electro-optic effect, such as lithium niobate ($LiNbO_3$), gallium arsenide (GaAs), indium phosphide (InP), etc., respective electric fields can be applied to the pair of arms to perform phase shifting to generate respective phase modulated signals, and phase modulated signals can be combined at the output portion. However, MZM modulators can be large in size (e.g., greater than one millimeter (mm)). Due their size, MZM modulators can consume a large amount of power (e.g., due to their large capacitance). Accordingly, the use of MZM modulators within a co-packaged architecture to implement CWDM may not be scalable into the future.

Aspects of the present disclosure can address the deficiencies above and other challenges by implementing CWDM optical links with ring resonators. For example, a CWDM optical link described here can be thermal and/or power efficient. An optical link described herein can include a set of unit cells, where each unit cell is designed to receive a respective wavelength of an optical signal. For example, the set of unit cells can be operatively coupled to at least one optical signal generator. In some embodiments, an optical signal generator is a laser. For example, the at least one optical signal generator can include a multi-wavelength optical signal generator that can generate multiple wavelengths of an optical signal.

Each unit cell can include an optical ring resonator ("ring resonator"). Generally, ring resonators operate as an optical filter. A unit cell herein can function as a ring modulator (RM). RMs are smaller than MZMs, and thus consume less power than MZMs. Accordingly, RMs can be used as modulators to support higher rate optical links.

Each unit cell can include set of waveguides that includes a ring waveguide (i.e., a closed loop). A ring waveguide can have an associated resonant frequency. When an on-resonance optical signal enters the ring waveguide, the optical signal circulates around the ring waveguide multiple times which enhances optical power.

The set of waveguides can further include a set of bus waveguides. The set of bus waveguides can include a first bus waveguide and a second bus waveguide, in which the ring waveguide is disposed between the first bus waveguide and the second bus waveguide. More specifically, a respective coupling region exists between the ring waveguide and each of the first bus waveguide and the second bus waveguide.

Each bus waveguide can have a pair of ports. For example, the first bus waveguide can include an input port and a through port. The input port is a first input port of the ring resonator that can receive an optical signal having one or more wavelengths from an optical signal generator. A first on-resonant wavelength can enter the ring waveguide while off-resonant wavelengths do not enter the waveguide. The through port is a first output port of the ring resonator through which the off-resonant wavelengths are output.

As another example, the second bus waveguide can include an add port and a drop port. The add port is a second input port of the ring resonator that can receive a second on-resonant wavelength. The second on-resonant wavelength can be used to extract the first on-resonant wavelength. The drop port is a second output port of the ring resonator through which the extracted first on-resonant wavelength can be output. In some embodiments, the second bus waveguide includes a photodiode (PD) located adjacent to the drop port. For example, the PD can be a slow PD. The PD can detect the extracted first on-resonant wavelength and generate a corresponding photocurrent. By detecting the phase shift between the resonant and non-resonant wavelengths, the PD can demodulate the optical signal and recover the transmitted data.

Although an RM can have some advantages over MZMs as described above, ring resonators can a small free spectral range (FSR). FSR refers to the spacing in optical frequency or wavelength between two successive reflected or transmitted optical intensity maxima or minima. Small FSRs may be not compatible with the wavelength separation needed to implement CWDM optical links. In addition, ring waveguides can be sensitive to temperature changes and can require thermal tuning. Attempts to increase the FSR of a ring resonator to implement a CWDM link can reduce the efficiency of the thermal tuning. For example, the ring waveguide will have to be decreased in size, which can induce high loss, induce susceptibility to manufacturing variation and/or increase thermal tuning power.

To address this, each unit cell can further include a multiplexer. More specifically, the set of waveguides can further include a third bus waveguide, and the multiplexer can be disposed between the first bus waveguide and the third bus waveguide. The third bus waveguide is a common output bus waveguide shared among each unit cell of the set of unit cells. The third bus waveguide can include an add port and an output port. The output port is a third output port of the ring resonator that can transmit optical signals output by each unit cell for downstream processing.

The multiplexer acts as a periodic medium to enable more efficient energy transfer between waveguides. To explain, a propagation constant of a waveguide (e.g., waveguide mode) describes the variation of the optical wave phase along the waveguide axis, and is related to the attenuation and phase shift of the wave. The propagation constant can be used to model the behavior of the waveguide, such as by calculating the electric field of the waveguide mode over time. The propagation constant for waveguide A, $\beta_A$, can be determined by the following equation:

$$\beta_A = \frac{2\pi}{\lambda_0} n_{eff}^A \tag{1}$$

where $\lambda_0$ is the free-space wavelength of the optical signal and $$n_{eff}^A$$

is the effective index of refraction of the waveguide A. Energy transfer between waveguide A and waveguide B is most efficient when their respective propagation constants are about equal (i.e., $\beta_A=\beta_B$), while energy transfer efficiency decreases as a function of the difference between the propagation constants increases. The index refraction of a waveguide can be affected by waveguide geometry and/or external means (e.g., heating, applied voltage).

Assume that waveguides A and B are asymmetric waveguides. The multiplexer can be placed between waveguides A and B to provide the additional momentum needed to make their respective propagation constants as close to equal as possible. In some embodiments, the multiplexer is a grating coupler. A grating coupler can operate by using a series of periodic gratings to couple optical signal between bus waveguides. For example, the periodic gratings can be formed within one of the waveguides.

One type of grating coupler is a co-directional grating assisted coupler. A co-directional grating assisted coupler is a grating coupler that can be disposed between asymmetric waveguides (e.g., the first bus waveguide and the third bus waveguide) through which modes are propagating in the same direction. For example, for a co-directional grating assisted coupler, the difference between the propagation constants of waveguide A and waveguide B can be modeled as follows:

$$\beta_A - \beta_B = m\frac{2\pi}{\Lambda} \tag{2}$$

where $\Lambda$ is the grating period and m is an integer representing diffraction order. The grating period represents the distance between adjacent grating structures, and the diffraction order describes the number of grating periods by which the optical signal is diffracted. For example, the grating period $\Lambda$ for a co-directional grating assisted coupler can be calculated as follows:

$$\Lambda = m\frac{\lambda_0}{|n_A - n_B|} \tag{3}$$

where $n_A$ and $n_B$ are the indices of refraction of waveguides A and B, respectively. When the condition for constructive interference is met, the two modes interfere constructively and form a standing wave in the grating coupler. The intensity of the standing wave can be modulated by the grating coupler and can be used to couple light into and out of a waveguide. The condition for constructive interference can be used to determine the design parameters of the co-directional grating assisted coupler, such as the grating period $\Lambda$, the diffraction order m, and the effective refractive indices of the waveguide modes. By adjusting these parameters, the coupling efficiency of the co-directional grating assisted coupler can be optimized for a specific application.

Another type of grating coupler is a contra-directional grating assisted coupler, referred to herein as a CDGC. A CDGC is a grating coupler that can be disposed between asymmetric waveguides (e.g., the first bus waveguide and the second bus waveguide) through which modes are propagating in opposite directions. The gratings are designed such that they scatter light in the opposite direction of propagation, which creates a contra-directional coupling effect. This contra-directional coupling effect allows for efficient coupling of light between the fiber and the waveguide, with low insertion loss and high coupling efficiency. For example, for a co-directional grating assisted coupler, the difference between the propagation constants of waveguide A and waveguide B can be modeled as follows:

$$\beta_A - (-\beta_B) = m\frac{2\pi}{\Lambda} \tag{4}$$

And the grating period $\Delta$ for a CDGC can be calculated as follows:

$$\Lambda = m\frac{\lambda_0}{|n_A + n_B|} \tag{5}$$

It can be shown that the energy transfer efficiency may be less sensitive to the difference between the propagation constants of the respective waveguides with respect to a CDGC, as compared to a co-directional grating assisted coupler. This is due at least in part to CDGC relying on constructive interference as the primary mechanism for enabling energy transfer between waveguides. Accordingly, in some embodiments, the multiplexer includes a CDGC. Further details regarding implementing CWDM optical links with ring resonators will be described in further detail below with reference to FIGS. 1-6.

Advantages of the present disclosure include, for example, increased thermal efficiency and reduced complexity as compared to traditional techniques. For example, embodiments described herein can be used to implement CWDM optical links without the use of MZMs that take up larger areas and consume more power than ring modulators described herein.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 104 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving optical signals.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116. In some embodiments, the processing circuitry 132 can facilitate a method to implement phase-dithering techniques for encoding auxiliary information within optical signal, as described below with reference to FIGS. 2-8.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2A:
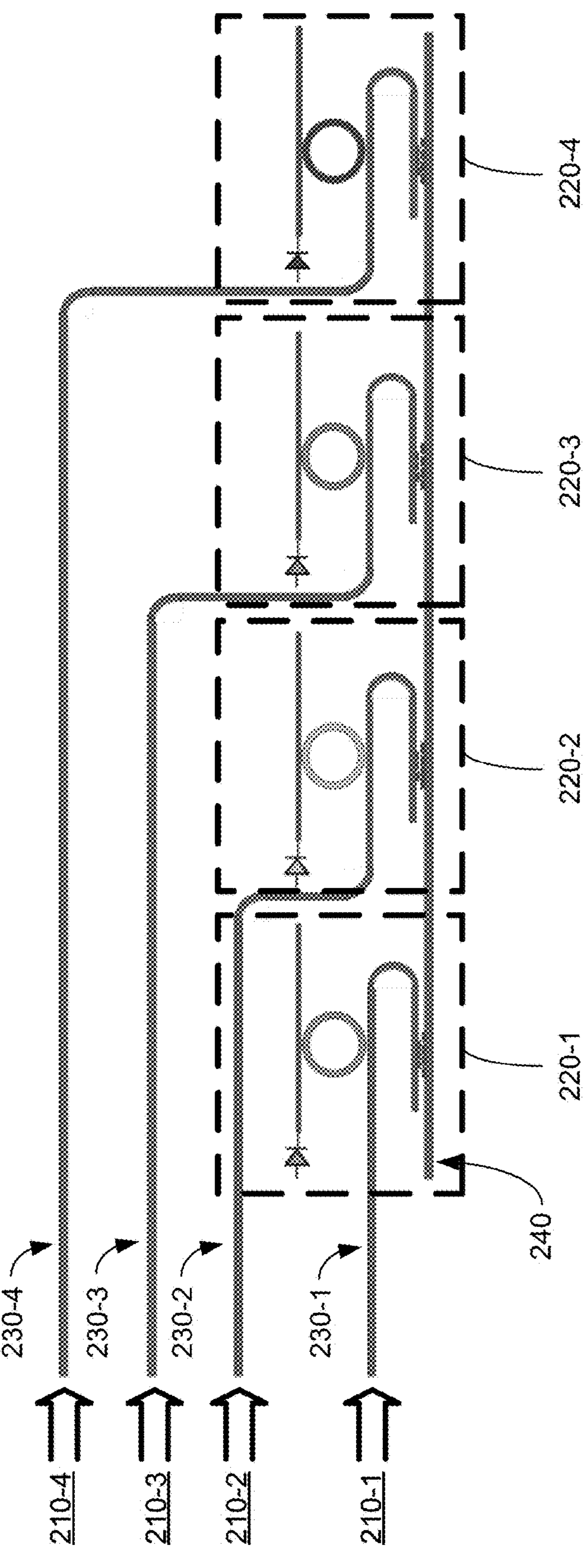
FIGS. 2A-2B are diagrams of example systems implementing a thermal-efficient ring-based coarse wavelength division multiplexing (CWDM) optical link, in accordance with at least some embodiments.
Figure 2A:

FIG. 2A is a diagram of an example system 200 implementing a thermal-efficient ring-based CWDM optical link, in accordance with at least some embodiments. As shown, a plurality of optical signals including optical signals 210-1 through 210-4 can be received by respective unit cells 220-1 through 220-4 via respective bus waveguide 230-1 through 230-4. In this illustrative embodiment, the CWDM optical link is a four wavelength CWDM optical link including four unit cells. However, the number of wavelengths and unit cells shown in FIG. 2A should not be considered limiting. System 200 further includes bus waveguide 240 common to each of unit cells 220-1 through 220-4.

Each of unit cells 220-1 through 220-4 is a unit cell of a ring modulator of the CWDM optical link. More specifically, each of unit cells 220-1 through 220-4 can include a respective ring waveguide configured to receive, via respective ones of bus waveguides 230-1 through 230-4, a respective one of optical signals 210-1 through 210-4. Moreover, each of unit cells 220-1 through 220-4 can include a respective multiplexer configured to filter the modulated optical signal. Each multiplexer can be disposed between bus waveguide 240 and the respective one of bus waveguides 230-1 through 230-4. Further details regarding each unit cell of the plurality of cells will now be described below with reference to FIG. 2B.

Figure 2B:
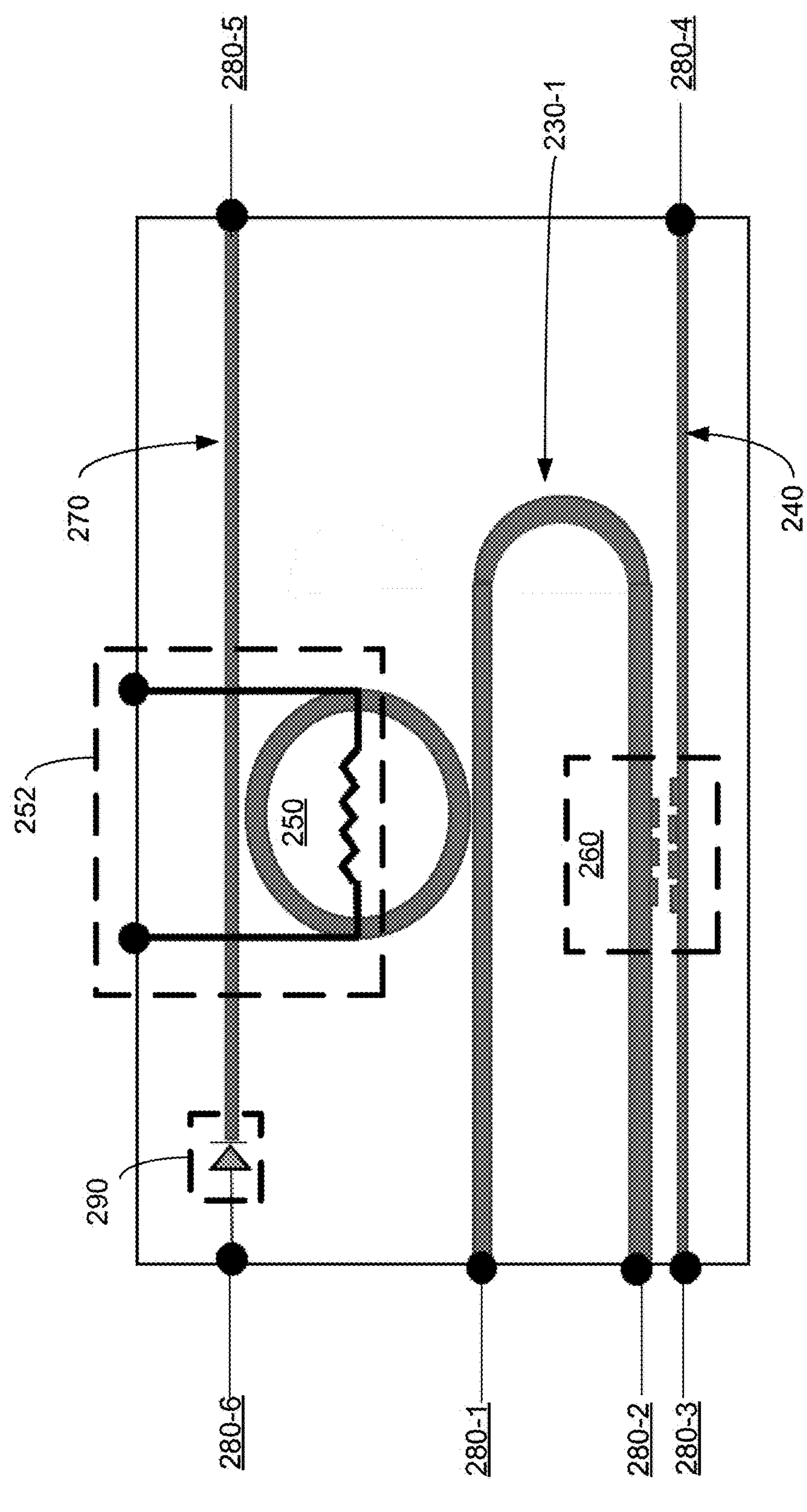

FIG. 2B is a diagram of example unit cell 220-1 of FIG. 2A, in accordance with at least some embodiments. Other unit cells (e.g., unit cells 220-2 through 220-4 of FIG. 2A) can be similar. As shown, unit cell 220-1 includes bus waveguide 230-1 and a portion of bus waveguide 240, as described above with reference to FIG. 2A. As further shown, unit cell 220-1 includes ring waveguide 250 having a ring cavity, at least one electrical component 252, multiplexer 260 disposed between bus waveguide 230-1 and bus waveguide 240, bus waveguide 270, and plurality of ports 280-1 through 280-6.

Ring waveguide 250 is a closed-loop structure. Ring waveguide 250 can be tuned to a resonant wavelength ($\lambda_0$) or a resonant frequency ($f_0$) such that on-resonance wavelengths (i.e., photons of the optical signal having the resonant wavelength/frequency) are coupled to ring waveguide 250, while off-resonance wavelengths (i.e., photons of the optical signal not having the resonant wavelength/frequency) pass through.

Port 280-1 can be an input port to receive an optical signal (e.g., optical signal 210-1 of FIG. 2A). In some embodiments, the optical signal includes multiple wavelengths. For example, the optical signal can include a light signal generated by a laser. Port 280-2 can be a through port through which off-resonance wavelengths pass through. Port 280-3 can be an add port. Port 280-4 can be an output port to output a filtered optical signal generated by multiplexer 260. Port 280-5 can be an add port to receive an additional on-resonance optical signal. Port 280-6 can be a drop port. In some embodiments, the second bus waveguide includes photodiode (PD) 290 located adjacent to port 280-6 (e.g., the drop port). For example, PD 290 can be a slow PD. PD 290 can detect the extracted first on-resonant wavelength and generate a corresponding photocurrent. By detecting the phase shift between the resonant and non-resonant wavelengths, PD 290 can demodulate the optical signal and recover the transmitted data.

Ring waveguide 250 can generate a modulated optical signal by modulating an optical signal received via port 280-1 (e.g., optical signal 210-1 of FIG. 2A). Multiplexer 260 can filter the modulated optical signal to generate a filtered optical signal. In some embodiments, multiplexer 260 is a grating coupler. For example multiplexer 260 can be a CDGC.

In some embodiments, the resonant frequency of ring waveguide 250 can be tuned (e.g., modified). For example, ring waveguide 250 can be formed from a material that exhibits the electro-optic effect (e.g., $LiNbO_3$, GaAs or InP), and the resonant frequency can be tuned using at least one electrical component 252. More specifically, at least one electrical component 252 can be operatively coupled (e.g., integrated into) ring waveguide 250 to modify at least one property of ring waveguide 250. For example, applying a voltage (e.g., bias) to the at least one electrical component can cause a modification to at least the index of refraction of ring waveguide 250, which can tune the resonant frequency of ring waveguide 250. In this illustrative example, at least one electrical component includes a resistor or resistive heating element. However, at least one electrical component 252 can include any suitable electronic component(s) in accordance with embodiments described herein. In some embodiments, at least one electrical component 252 can include at least one of a diode, a resistor, or a transistor (e.g., field-effect transistor (FET)). At least one electrical component 252 can enable a variable resonant frequency. At least one electrical component 252 can include multiple electrical components (e.g., diodes, resistors and/or transistors) that have respective sensitivities can be used to tune the resonant frequency. Accordingly, at least one electrical component 252 can include multiple electrical components to achieve greater precision in resonant frequency tuning, in some embodiments. An example ring resonator including ring waveguide 250 will now be described below with reference to FIG. 3.

Figure 3:
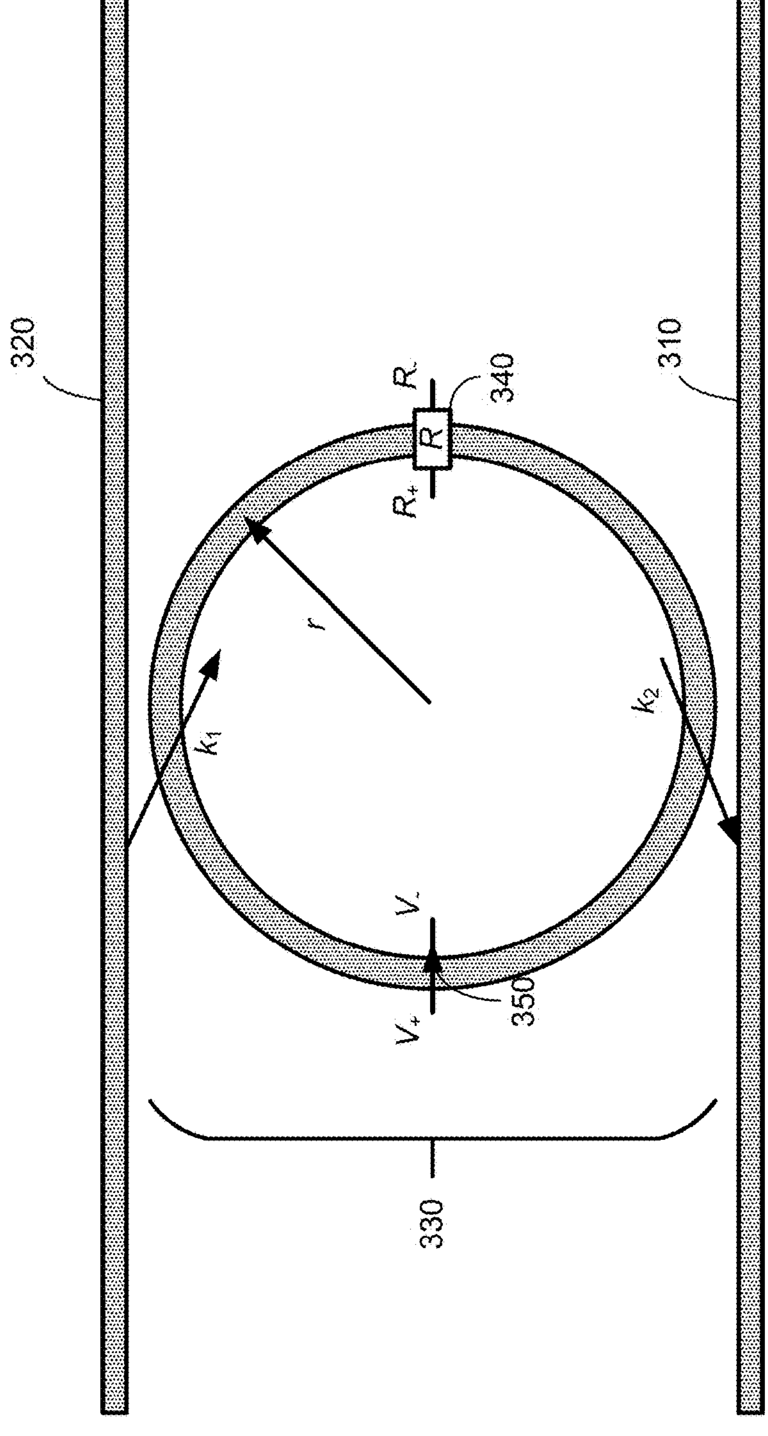
FIG. 3 is a diagram of an example ring resonator, in accordance with at least some embodiments.

FIG. 3 illustrates an example ring resonator 300, in accordance with at least some embodiments. Ring resonator 300 can be implemented within a unit cell of a CWDM link (e.g., as described above with reference to FIGS. 2A-2B. Ring resonator 300 includes a pair of bus waveguides 310 and 320. For example, bus waveguide 310 correspond to bus waveguide 230-1 of FIG. 2B and bus waveguide 320 can correspond to bus waveguide 270 of FIG. 2B.

Ring resonator 300 further includes ring waveguide 330 disposed between bus waveguides 310 and 320. Ring waveguide 330 can correspond to ring waveguide 250 of FIG. 2B. The arrow "r" denotes the radius of ring waveguide 330, as measured as the distance from the center of the ring to the center of ring waveguide 330. The radius of ring waveguide 330 can be on the order of micrometers or microns (μm) in some embodiments. In some embodiments, the radius of ring waveguide 330 is between about 1 μm to about 10 μm. In some embodiments, the radius of ring waveguide 330 is between about 3 μm to about 6 μm.

Ring resonator 300 is configured to receive an optical signal including one or more wavelengths generated by an optical signal generator (e.g., optical signal 210-1 of FIG. 2A) via an input port of bus waveguide 310. In some embodiments, the optical signal includes multiple wavelengths. For example, the optical signal can include a light signal generated by a laser. Ring waveguide 330 can be tuned to a resonant wavelength ($\lambda_0$) or a resonant frequency ($f_0$) such that on-resonance wavelengths (i.e., photons of the optical signal having the resonant wavelength/frequency) are coupled to ring waveguide 330 and re-routed to the drop port of bus waveguide 320, while off-resonance wavelengths (i.e., photons of the optical signal not having the resonant wavelength/frequency) pass through toward the through port of bus waveguide 310.

Illustratively, assume that a first photon is an on-resonance photon received by the input port of bus waveguide 310. As this photon travels left to right, the first photon enters ring waveguide 330 via optical coupling. If a second photon is an on-resonance photon received by the input port of bus waveguide 310, then the second photon can add coherently (in phase and polarization and frequency) with the first photon that is already in ring waveguide 330. This initiates a process referred to as field enhancement, in which on-resonance photons continue to build up within ring waveguide 330. Arrow "$k_1$" denotes a first coupling coefficient corresponding to an amount of optical power coupled to ring waveguide 330 from bus waveguide 310 (e.g., percentage). Waveguides 310-330 can be formed from any suitable material that has properties (e.g., index of refraction) defining the resonant wavelength/frequency, and thus enabling the optical coupling of on-resonance photons within ring waveguide 330. In some embodiments, the waveguides 310-330 are formed from the same material. Alternatively, at least one of waveguides 310-330 can be formed from a different material.

The field enhancement process described above cannot occur indefinitely. At a certain electrical field or optical power level, the number of on-resonance photons within ring waveguide 330 can reach a saturation threshold and begin to radiate or couple out of ring waveguide 330. Arrow "$k_2$" denotes a second coupling coefficient corresponding to an amount of optical power coupled from ring waveguide 330 to bus waveguide 320 (e.g., percentage).

The optical power level can be correlated with a quality factor of ring resonator 300, Q. The quality factor Q is a dimensionless quantity that serves as a metric of "sharpness" of resonance or filtering achieved by ring waveguide 330. The quality factor Q can be used to determine the average number of round-trip turns or cycles that a photon can make before leaving ring waveguide 330 and entering bus waveguide 320. For example, the quality factor Q can be directly (e.g., linearly) related to average photon lifetime, which is the average time that a photo will spend in ring waveguide 330 before exiting. Accordingly, the higher the quality factor Q, the greater the average photon lifetime and number of round-trip turns.

The quality factor Q can be inversely proportional to a full width at half maximum (FWHM) value of the transmission spectra observed to exit. For example, $Q=\lambda_0/\mathrm{FWHM}$. Here, the FWHM is the difference or distance between two wavelength values having an optical power level determined to be equal to half of a maximum optical power value. For example, the optical power level can be modeled as a transfer function (e.g., Lorentzian). Accordingly, a greater FWHM value translates into a lower Q value. The FWHM value can be defined by a first wavelength $\lambda_1$ having a value less than the value of 2 and a second wavelength $\lambda_2$ having a value greater than the value of $\lambda_0$.

The quality factor Q can impact the sensitivity of the encoded phase shift to the incoming optical signal. For example, the higher the quality factor Q, the "steeper" the slope and finer voltage steps may be implemented to perform the phase shaft (e.g., 1 millivolt (mV) instead of 10 mV). A higher quality factor Q can also be helpful to reduce cross-talk with respect to a many-wavelength system in which many incoming optical signals are spaced spectrally close to each other.

In some embodiments, ring resonator 300 is an overcoupled ring resonator. An overcoupled ring resonator is a ring resonator in which the input energy entering the ring resonator cavity is greater than the held energy plus the output energy. For example, an overcoupled ring resonator can operate in an overcoupled regime in which the amplitude of the optical signal is minimally impacted. Thus, a minimal amount of amplitude reduction of the optical signal can be achieved by using an overcoupled ring resonator. In some embodiments, a reduction in amplitude of the optical signal of less than or equal to 5% is achieved using an overcoupled ring resonator. In some embodiments, a reduction in amplitude of the optical signal of less than or equal to 1% is achieved using an overcoupled ring resonator. Thus, the amplitude of an optical signal can be minimally impacted by slightly detuning an overcoupled ring resonator with respect to the frequency of the optical signal.

In some embodiments, ring resonator 300 is an undercoupled ring resonator. In contrast to an overcoupled ring resonator, an undercoupled ring resonator is a ring resonator in which the input energy entering the ring resonator cavity is less than held energy maintained within the ring resonator cavity plus output energy leaking out of the ring resonator cavity.

In some embodiments, ring resonator 300 is a critically coupled ring resonator. A critically coupled ring resonator is a ring resonator in which the input energy entering the ring resonator cavity is equal to the held energy plus the output energy. In contrast to, e.g., an overcoupled ring resonator, a critically coupled ring resonator can more significantly impact (e.g., attenuate) the amplitude of the optical signal.

In some embodiments, the resonant frequency of ring waveguide 330 can be tuned (e.g., modified). For example, ring waveguide 330 can be formed from a material that exhibits the electro-optic effect (e.g., $LiNbO_3$, GaAs or InP), and the resonant frequency can be tuned using at least one electrical component. More specifically, at least one electrical component can be operatively coupled (e.g., integrated into) ring waveguide 330 to modify at least one property of ring waveguide 330. For example, applying a voltage (e.g., bias) to the at least one electrical component can cause a modification to at least the index of refraction of ring waveguide 330, which can tune the resonant frequency of ring resonator 300. The at least one electrical component can include any suitable electronic component(s) in accordance with embodiments described herein. In some embodiments, the at least one electrical component can include at least one of a diode, a resistor, or a transistor (e.g., field-effect transistor (FET)). Thus, the at least one electrical component can enable a variable resonant frequency. Multiple electrical component (e.g., diodes, resistors and/or transistors) that have respective sensitivities can be used to tune the resonant frequency. Accordingly, the at least one electrical component can include multiple electrical components to achieve greater precision in resonant frequency tuning, in some embodiments.

In this illustrative embodiment, the at least one electrical component includes diode 340. In some embodiments, diode 340 is a P-N diode including a P-N junction between P-type semiconductor material and N-type semiconductor material. In some embodiments, diode 340 is a P-I-N diode, in which intrinsic semiconductor material (I) is disposed between P-type and N-type semiconductor material. For example, when diode 340 is in an off state (i.e., turned off), ring resonator 300 can have an initial resonant frequency. When processing circuitry causes an amount of positive voltage to be applied to diode 340, diode 340 can generate a corresponding number of charge carriers for injection into ring waveguide 330. These charge carriers can modify the index of refraction of ring waveguide 330 in a manner that modifies the initial resonant frequency. As another example, if diode 340 is a P-N diode, then an amount of negative voltage applied to diode 340 can expand the depletion region between the P-type semiconductor material and the N-type semiconductor material. This can cause removal of charge carriers from ring waveguide 330, which can modify the initial resonant frequency. Additionally or alternatively, as shown in this illustrative embodiment, the at least one electrical component can include resistor (e.g., resistive heater) 350. For example, when processing circuitry causes an amount of voltage to be applied to resistor 350, resistor 350 can tune the local temperature which tunes the resonant frequency. Diode 340 and resistor 350 can adjust the resonant frequency with different amounts of granularity. For example, diode 340 can be a fine-tuning component and resistor 350 can be a coarse-tuning component.

The resonant frequency can be tuned using resonant frequency tuning data (e.g., digital data). For example, the resonant frequency tuning data can include built-in self-test (BIST) data that can be used as feedback for adjusting the at least one electrical component. More specifically, processing circuitry can adjust the at least one electrical component to modify the resonant frequency by modifying, e.g., an index of refraction of a waveguide material of the ring waveguide. Adjusting the at least one electrical component to modify the at least one property of the at least one optical delay component can include determining a resonant frequency from the resonant frequency tuning data, and causing an amount of voltage, current, power, etc. to be applied to the at least one electrical component in accordance with the resonant frequency. In some embodiments, the amount of voltage, current, power, etc. causes the at least one electrical component to, in accordance with the amount of optical delay, perform at least one of: generate a number of charge carriers, or change a local temperature of the at least one optical delay component. The relationship between the resonant frequency and the amount of voltage, current, power, etc. to be applied to the at least one electrical component can be determined a priori at the foundry fabrication level during device calibration. For example, the processing circuitry can determine, from the resonant frequency tuning data, the amount of voltage to be applied to the at least one electrical component in a number of ways. In some embodiments, the resonant frequency tuning data includes calibration data (e.g., stored in a look-up stable in local memory). The processing circuitry can include a feedback circuit that can analyze a current diagram (e.g., eye diagram) or jitter value (e.g., derived from a BIST block), calculate a desired amount of time delay, determine an amount of voltage to achieve the desired amount of time delay, and set the amount of voltage as the amount of voltage to be applied to the at least one electrical component. In alternative embodiments, the processing circuitry can apply different amounts of voltage within a valid range until the jitter value is minimized.

Figure 4:
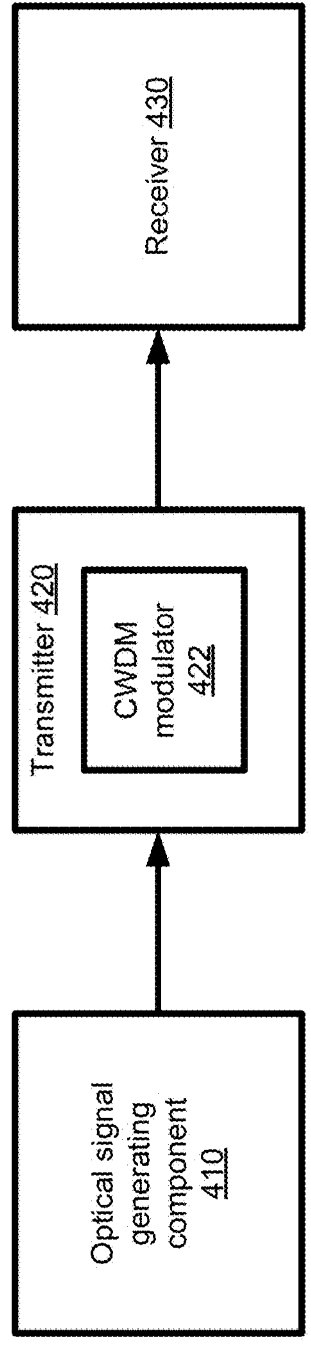
FIG. 4 is a block diagram of an example system implementing a thermal-efficient ring-based coarse wavelength division multiplexing (CWDM) optical link, in accordance with at least some embodiments.

FIG. 4 illustrates an example system 400 implementing a thermal-efficient ring-based CWDM optical link, in accordance with at least some embodiments. As shown, system 400 can include an optical signal generating component 410 including at least one optical signal generator. In some embodiments, optical signal generating component 410 includes a multi-wavelength signal generator configured to generate an optical signal having multiple wavelengths. In some embodiments, an optical signal generator is a laser. For example, the laser can be a multi-wavelength laser.

System 400 can further include transmitter 420. Transmitter 420 can be similar to transmitter 102 of FIG. 1. In some embodiments, and as shown in FIG. 4, transmitter 420 can include CWDM modulator 422 to implement the CWDM optical link. For example, CWDM modulator 422 can include a set of unit cells, with each unit cell including a ring modulator including a ring resonator and a multiplexer (e.g., CDGC). In some embodiments, CWDM modulator 422 can be separate from transmitter 420 (e.g., a standalone component).

System 400 can further include receiver 430 to receive optical signals from transmitter receiver 420 (e.g., modulated optical signal). Receiver 430 can be similar to receiver 104 of FIG. 1. In some embodiments, receiver 430 includes a CWDM modulator to implementing the CWDM optical link. Further details regarding system 400 are described above with reference to FIGS. 1-3 and will now be described below with reference to FIG. 5.

Figure 5:
FIG. 5 is a flow diagram of an example method to implement thermal-efficient ring-based coarse wavelength division multiplexing (CWDM) optical links, in accordance with at least some embodiments.
Figure 5:
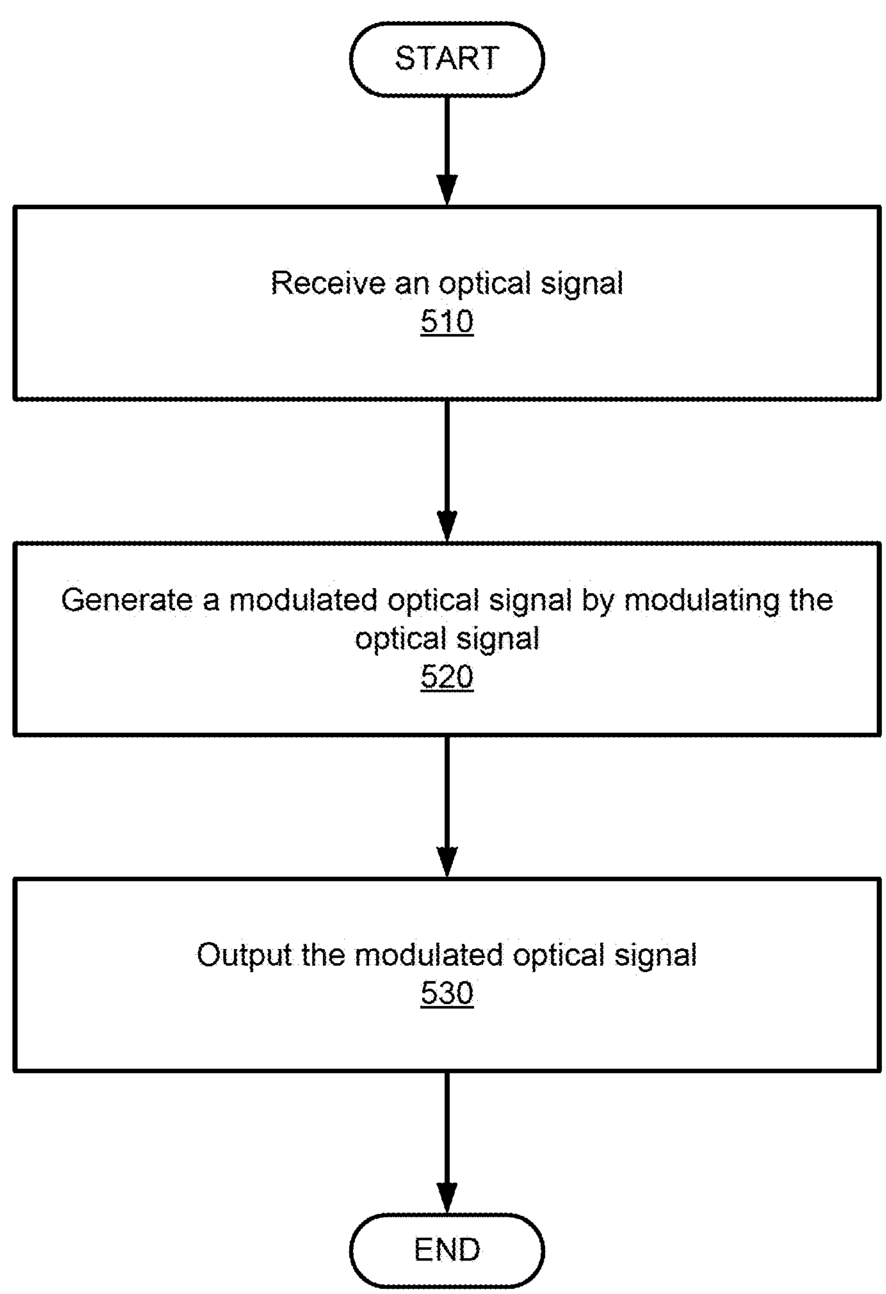

FIG. 5 illustrates a flow diagram of a method 500 to implementing thermal-efficient ring-based CWDM optical links, according to at least one example embodiment. Method 500 can be performed by processing logic comprising hardware, software, firmware, or any combination thereof. In at least one embodiment, method 500 is performed by a unit cell of a set of unit cells of a CWDM modulator, such as unit cell 220-1 of FIGS. 2A-2B. For example, CWDM modulator can be used by a transmitter, such as transmitter 420 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, an optical signal is received. More specifically, the optical signal can be received by a unit cell of a ring modulator of a CWDM optical link via a first bus waveguide of the unit cell. The unit cell further includes a ring waveguide and a multiplexer. The optical signal can be received via the first bus waveguide from an optical signal generator. In some embodiments, the optical signal generator is a multi-wavelength optical signal generator. In some embodiments, the optical signal generator is a laser. In some embodiments, the multiplexer includes a grating coupler. For example, the multiplexer can include a CDGC.

At operation 520, a modulated optical signal is generated by modulating the optical signal and, at operation 530, the modulated optical signal is output via a second bus waveguide. The multiplexer can be disposed between the first bus waveguide and the second bus waveguide. The second bus waveguide can be a common bus waveguide operatively coupled to a plurality of unit cells of the ring modulator including the unit cell. The unit cell can further include a third bus waveguide including a photodiode, where the ring waveguide is disposed between the first bus waveguide and the third bus waveguide. In some embodiments, at least one electrical component is used to tune a resonant frequency of the ring waveguide by modifying an index of refraction of a material of the ring waveguide. For example, the at least one electrical component can include at least one of: a resistor, a diode or a transistor. Further details regarding operations 510-530 are described above with reference to FIGS. 1-4.

Figure 6:
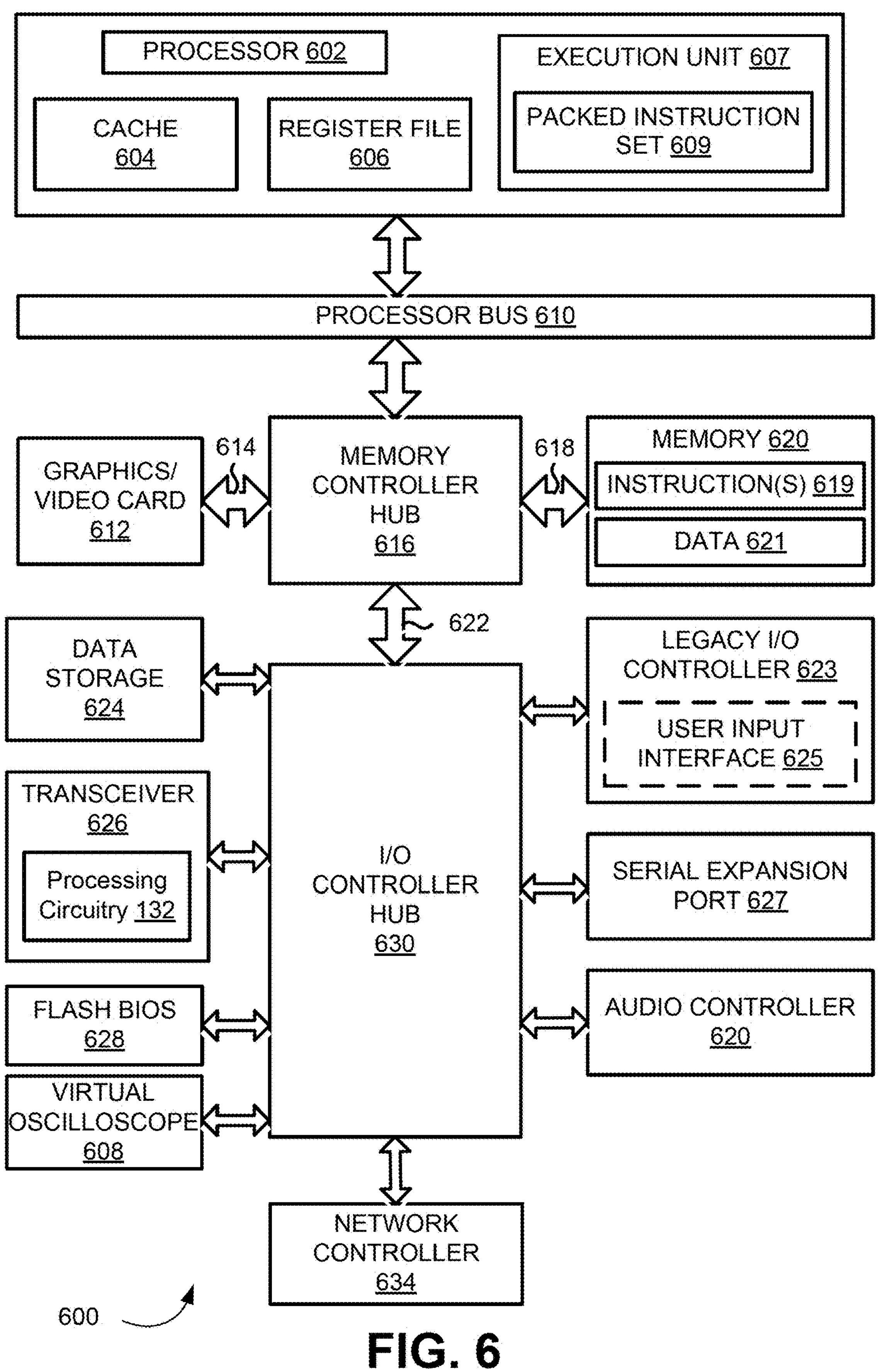
FIG. 6 illustrates an example computer system including a transceiver including a chip-to-chip interconnect, in accordance with at least some embodiments.

FIG. 6 illustrates an example computer system 600 including a transceiver including a chip-to-chip interconnect, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle packed instruction set 609. In at least one embodiment, by including packed instruction set 609 in an instruction set of general-purpose processor 602, along with associated circuitry to execute instructions, operations used by many multimedia applications may be performed using packed data in general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, audio controller 629, firmware hub ("flash BIOS") 628, transceiver 626, a data storage 624, legacy I/O controller 623 containing user input interface 625 and a keyboard interface, serial expansion port 627, such as a USB, and network controller 634. Data storage 624 may comprise a hard disk drive, a floppy disk drive, a CD-ROM device, a flash memory device, or other mass storage device. In an embodiment, transceiver 626 includes a constrained FFE 608.

In at least one embodiment, FIG. 6 illustrates a system, which includes interconnected hardware devices or "chips" in transceiver 626—e.g., transceiver 626 includes a chip-to-chip interconnect including first device 110 and second device 112 as described with reference to FIG. 1). In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof. In at least one embodiment, one or more components of system 600 are interconnected using compute express link ("CXL") interconnects. In an embodiment, transceiver 626 can include processing circuitry 132 as described with reference to FIG. 1. In such embodiments, processing circuitry 132 can facilitate a method to implement phase-dithering techniques for encoding auxiliary information within an optical signal. For example, processing circuitry 132 can implement techniques for implementing CWDMs with ring resonators, as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:

a unit cell of a ring modulator of a coarse wavelength division multiplexing (CWDM) optical link, the unit cell comprising:

a ring waveguide configured to receive, via a first bus waveguide, an optical signal, and modulate the optical signal to generate a modulated optical signal; and a multiplexer comprising a grating coupler, disposed between the first bus waveguide and a second bus waveguide, configured to filter the modulated optical signal to generate a filtered optical signal by coupling light within a specific wavelength range between the first bus waveguide and the second bus waveguide.

2. The system of claim 1, wherein the unit cell further comprises a third bus waveguide, wherein the ring waveguide is disposed between the first bus waveguide and the third bus waveguide.

3. The system of claim 2, wherein the third bus waveguide is coupled to a photodiode.

4. The system of claim 1, wherein the unit cell further comprises at least one electrical component configured to tune a resonant frequency of the ring waveguide by modifying an index of refraction of a material of the ring waveguide.

5. The system of claim 4, wherein the at least one electrical component comprises at least one of: a resistor, a diode or a transistor.

6. The system of claim 1, wherein the grating coupler is a contra-directional grating assisted coupler.

7. The system of claim 1, wherein the second bus waveguide is operatively coupled to a plurality of unit cells comprising the unit cell.

8. A method, comprising:

receiving, by a unit cell of a ring modulator of a coarse wavelength division multiplexing (CWDM) optical link, an optical signal via a first bus waveguide of the unit cell;

generating, by a ring waveguide of the unit cell, a modulated optical signal based on the optical signal;

filtering, by a multiplexer of the unit cell that is disposed between the first bus waveguide and a second bus waveguide, the modulated optical signal to generate a filtered optical signal by coupling light within a specific wavelength range between the first bus waveguide and the second bus waveguide, wherein the multiplexer comprises a grating coupler; and outputting, by the unit cell via the second bus waveguide, the filtered optical signal.

9. The method of claim 8, wherein the unit cell further comprises a third bus waveguide, wherein the ring waveguide is disposed between the first bus waveguide and the third bus waveguide.

10. The method of claim 9, wherein the third bus waveguide is coupled to a photodiode.

11. The method of claim 8, further comprising using at least one electrical component to tune a resonant frequency of the ring waveguide by modifying an index of refraction of a material of the ring waveguide.

12. The method of claim 11, wherein the at least one electrical component comprises at least one of: a resistor, a diode or a transistor.

13. The method of claim 8, wherein the grating coupler is a contra-directional grating assisted coupler.

14. A system comprising:

a coarse wavelength division multiplexing (CWDM) optical link comprising a transmitter and a receiver, at least one of the transmitter or the receiver comprising a modulator comprising plurality of unit cells, wherein each unit cell of the plurality of unit cells comprises:

a plurality of waveguides comprising a ring waveguide having a respective resonant frequency, a first bus waveguide and a second bus waveguide, wherein the ring waveguide is configured to receive, via the first bus waveguide, an optical signal, and modulate the optical signal to generate a modulated optical signal; and a multiplexer comprising a grating coupler, disposed between the first bus waveguide and a second bus waveguide, configured to filter the modulated optical signal to generate a filtered optical signal by coupling light within a specific wavelength range between the first bus waveguide and the second bus waveguide.

15. The system of claim 14, wherein the unit cell further comprises a third bus waveguide, wherein the ring waveguide is disposed between the first bus waveguide and the third bus waveguide.

16. The system of claim 15, wherein the third bus waveguide is coupled to a photodiode.

17. The system of claim 14, wherein each unit cell further comprises at least one electrical component configured to tune a resonant frequency of the ring waveguide by modifying an index of refraction of a material of the ring waveguide.

18. The system of claim 17, wherein the at least one electrical component comprises at least one of: a resistor, a diode or a transistor.

19. The system of claim 14, wherein the grating coupler is a contra-directional grating assisted coupler.

* * * * *